(12) United States Patent
Watts

(10) Patent No.: US 11,772,913 B2
(45) Date of Patent: Oct. 3, 2023

(54) SOLAR PANEL HANDLING AND INSTALLATION METHOD

(71) Applicant: CARBONBITE INNOVATIONS INC., Red Deer (CA)

(72) Inventor: Collin Watts, Red Deer (CA)

(73) Assignee: CARBONBITE INNOVATIONS INC., Red Deer (CA)

( * ) Notice: Subject to any disclaimer, the term of this patent is extended or adjusted under 35 U.S.C. 154(b) by 0 days.

(21) Appl. No.: 17/698,157

(22) Filed: Mar. 18, 2022

(65) Prior Publication Data

US 2022/0297957 A1 Sep. 22, 2022

Related U.S. Application Data

(60) Provisional application No. 63/162,673, filed on Mar. 18, 2021.

(51) Int. Cl.
| | |
|---|---|
| *B65G 59/04* | (2006.01) |
| *H02S 20/10* | (2014.01) |
| *B66C 1/02* | (2006.01) |
| *B66C 19/00* | (2006.01) |

(52) U.S. Cl.
CPC ............... *B65G 59/04* (2013.01); *B66C 1/02* (2013.01); *B66C 19/00* (2013.01); *H02S 20/10* (2014.12); *B65G 2201/022* (2013.01); *B66C 2700/01* (2013.01); *B66C 2700/0357* (2013.01)

(58) Field of Classification Search
CPC ... B65G 59/04; B65G 2201/022; H02S 20/10; H02S 10/00; B66C 1/02; B66C 19/00; B66C 2700/01; B66C 2700/0357; B66C 1/0243; B66C 1/0212
See application file for complete search history.

(56) References Cited

U.S. PATENT DOCUMENTS

| | | | |
|---|---|---|---|
| 9,453,660 B2 * | 9/2016 | French | B60P 1/5423 |
| 11,228,275 B2 * | 1/2022 | Miller | H02S 10/00 |
| 2012/0027550 A1 * | 2/2012 | Bellacicco | H01L 31/18 |
| | | | 414/547 |

* cited by examiner

*Primary Examiner* — Lynn E Schwenning
(74) *Attorney, Agent, or Firm* — Ryan W. Dupuis; Kyle R. Satterthwaite; Ade & Company Inc.

(57) ABSTRACT

Solar panels are prepared for installation on an array frame by initially tipping packages of palletized, bundled, vertically-oriented panels in a preparation area to form a vertical stack of horizontally oriented panel separated from the pallet and packaging material for placement on the upper supporting surface of the transport deck. The transport deck is displaced longitudinally alongside a rack of the array frame, together with a lifting machine having a lifting head on a lifting arm for transferring solar panels from a longitudinal row of stacked solar panels on the transport deck to the array frame. The lifting head may be adapted to support one panel from each of the stacks on the transport deck for simultaneous transfer from the transport deck to the array frame.

17 Claims, 7 Drawing Sheets

SOLAR PANEL HANDLING AND INSTALLATION METHOD

This application claims the benefit under 35 U.S.C. 119(e) of U.S. provisional application Ser. No. 63/162,673, filed Mar. 18, 2021.

FIELD OF THE INVENTION

The present invention relates to the handling and installation of solar panels onto an array frame of a solar array in which the solar panels are provided in bundles of vertically oriented panels supported on pallets, and more particularly the present invention relates to transferring of the solar panels from pallet mounted bundles onto a transport deck and/or subsequent transferring of the solar panels from the transport deck onto the array frame.

BACKGROUND

A typically solar array of solar panels includes an array frame comprised of racks that support longitudinally extending rows of solar panels thereon. The individual solar panels are typically assembled by manufacturers in bundles on pallets as a package in which each package includes a plurality of vertically oriented panels supported parallel and adjacent to one another on the pallet. Installation of the solar panels onto the array frame requires considerable manually intensive labor to individually remove each solar panel from its respective pallet mounted bundle and place the solar panel on the array frame. Additional labor is required to dispose of the packaging materials that protect the solar panels on the pallets during transport from the manufacturing facility to a facility near the installation location.

SUMMARY OF THE INVENTION

According to one aspect of the invention there is provided a method of installing solar panels on an array frame, the method comprising:

(a) providing a plurality of solar panels arranged horizontally in one or more vertical stacks on an upper supporting surface of a transport deck;

(b) providing a lifting machine having a lifting arm and a lifting head on the lifting arm, the lifting head including one or more panel mounts arranged to support one or more solar panels thereon, the lifting head being supported by the lifting arm for movement between the transport deck and the array frame;

(c) collecting at least one solar panel from the one or more vertical stacks on the transport deck using the one or more panel mounts;

(d) transferring said at least one solar panel from the transport deck to the array frame using the lifting head; and (e) depositing said at least one solar panel on the array frame by releasing said at least one solar panel from the one or more panel mounts of the lifting head.

Arranging the solar panels on a transport deck in vertical stacks together with use of a lifting head capable of lifting plural solar panels together allow the solar panels to be safely and efficiently transferred on the array frame with minimal manual labor required. Locating the solar panels in a plurality of the vertical stacks arranged in a longitudinally extending row on the transport deck, and simultaneously collecting one solar panel from each vertical stack on the lifting head to support a row of solar panels on the lifting head for subsequent transfer and deposit of the row of solar panels together onto the array frame allows further gains in efficiency to install the solar panels on the array frame.

The method may further comprise displacing the transport deck and the lifting machine longitudinally alongside the array frame and repeating steps (c) through (e).

Preferably the method includes providing the solar panels in a plurality of the vertical stacks arranged in a longitudinally extending row on the transport deck such that the lifting head can simultaneously collect one solar panel from each vertical stack to support a row of solar panels on the lifting head for subsequent transfer and deposit of the row of solar panels together onto the array frame.

The lifting head may comprise a rigid frame extending in a longitudinal direction of the row of solar panels and a plurality of panel mounts arranged in a row along the rigid frame.

Spacers may be provided between adjacent vertical stacks of the solar panels within a row of plural vertical stacks on the transport deck, in which each spacer has a dimension in the longitudinal direction that is equal to a prescribed space between adjacent ones of the solar panels installed on the array frame.

The transport deck may further include a first end support at a first end of the transport deck and abutting a first vertical stack of the solar panels against the end support, and/or a removable second end support at an opposing second end of the transport deck in abutment with a final vertical stack within a row of stacks opposite from the first vertical stack. The end supports may comprise wedges or other supporting members used to secure the stack relative to the upper supporting surface of the transport deck.

In one embodiment, the panel mounts on the lifting head comprise suction devices arranged to support the solar panels thereon using a vacuum pressure.

Alternatively, the panel mounts may comprise clamping devices having opposing jaws arranged to be clamped against opposing ends of the solar panels.

In one embodiment, the lifting machine comprises an excavator and the lifting arm comprises an excavator arm of the excavator in which the excavator arm supports the lifting head thereon. In this instance, the method may further include displacing the lifting machine alongside the array frame in a forward working direction and moving the lifting head transversely to the forward working direction between the transport deck and the array frame.

Alternatively, the lifting machine may comprise a loader and the lifting arm comprises loading arms of the loader. In this instance, the method may further comprise: (i) orienting the lifting machine to be displaced alongside the array frame in a forward working direction; (ii) mounting an adapter frame on the loading arms of the loader in place of a convention loader bucket, the adapter frame including a support beam extending transversely to the forward working direction from a proximal end above the transport deck to a distal end of the support beam above the array frame; (iii) supporting the panel mounts for translating movement along the support beam of the adapter frame; (iv) loading the solar panels on the panel mounts at the proximal end of the support beam; (v) displacing the panel mounts along the support beam towards the distal end of the support beam; and (vi) installing the solar panels onto the array frame at the distal end of the support beam.

In the above noted method, the step of providing the solar panels on the transport deck may further comprise: (i) providing the solar panels in packages, in which each package comprises a plurality of the solar panels being arranged in a bundle on a pallet and each solar being vertically oriented within the bundle; (ii) tipping one of the packages in a preparation area such that the bundle of solar panels of the package forms a vertical stack of horizontally oriented solar panels; (iii) separating the vertical stack from the pallet in the preparation area; and (iv) transferring the vertical stack from the preparation area onto the upper supporting surface of the transport deck.

According to a second aspect of the present invention there is provided a method of preparing solar panels for installation on an array frame, the method comprising:

providing the solar panels in packages, in which each package comprises a plurality of the solar panels arranged vertically in a bundle on a pallet;

tipping one of the packages in a preparation area such that the bundle of solar panels of the package forms a vertical stack of horizontally arranged solar panels;

separating the vertical stack from the pallet in the preparation area; and transferring the vertical stack from the preparation area onto the upper supporting surface of the transport deck.

By tipping the packages in a preparation area followed by transferring the solar panels into vertical stacks on a transport deck, the packaging material and pallets can be efficiently disposed of at a preparation area separate from the installation location, while also optimally orienting the solar panels for ease of subsequent mounting onto the array frame.

The method may further comprise: (i) providing a tipping apparatus comprising a loading surface and a landing surface oriented perpendicularly to one another and being movable together about a tipping axis through a range of 90 degrees between a loading orientation in which the loading surface faces upward and a landing orientation in which the landing surface faces upward; (ii) loading one of the packages onto the loading surface in the loading orientation of the tipping apparatus such that the solar panels of the package are parallel to the landing surface; (iii) pivoting the tipping apparatus onto the preparation area from the loading orientation to the landing orientation; and (iv) transferring the stack of solar panels from the tipping apparatus to the transport deck.

The method may further include positioning the transport deck adjacent to the preparation area and transferring the stack of solar panels from the preparation area to the transport deck using (i) pallet handling equipment, or (ii) a gantry crane extending over the preparation area and the transport loading area.

The method may further include removing packaging materials from the stack of solar panels prior to transferring the stack of solar panels from the preparation area onto the upper supporting surface of the transport deck.

The transport deck may further include raised rails extending longitudinally above the upper supporting surface on the transport deck such that the method may include depositing the stack of solar panels on the raised rails when transferring the stack of solar panels onto the transport deck.

BRIEF DESCRIPTION OF THE DRAWINGS

Some embodiments of the invention will now be described in conjunction with the accompanying drawings in which.

In the drawings like characters of reference indicate corresponding parts in the different figures.

DETAILED DESCRIPTION

Figure 1:
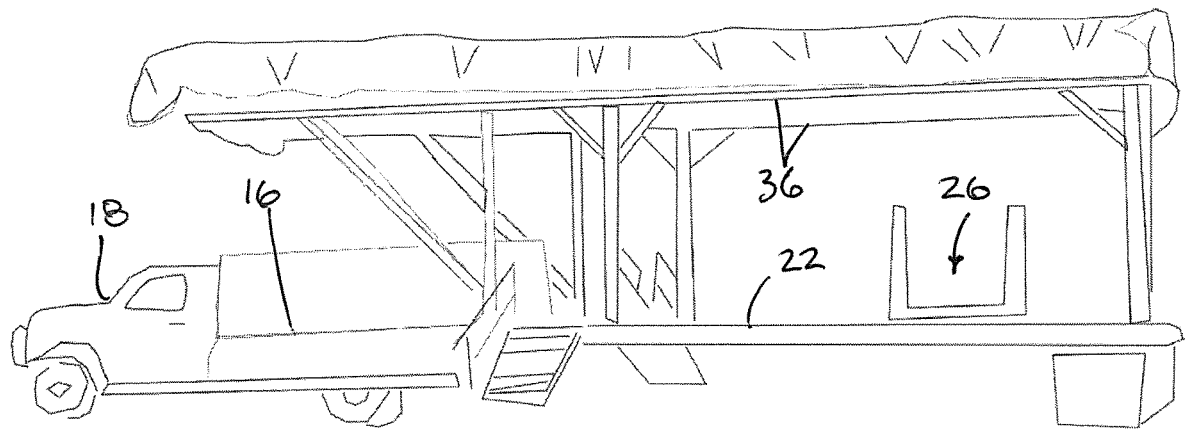
FIG. 1 is a perspective view of a loading platform at a preparation area including a tipping apparatus for receiving pallet mounted solar panels, and a transport deck adjacent to the preparation area onto which prepared stacks of solar panels can be deposited.
Figure 2:
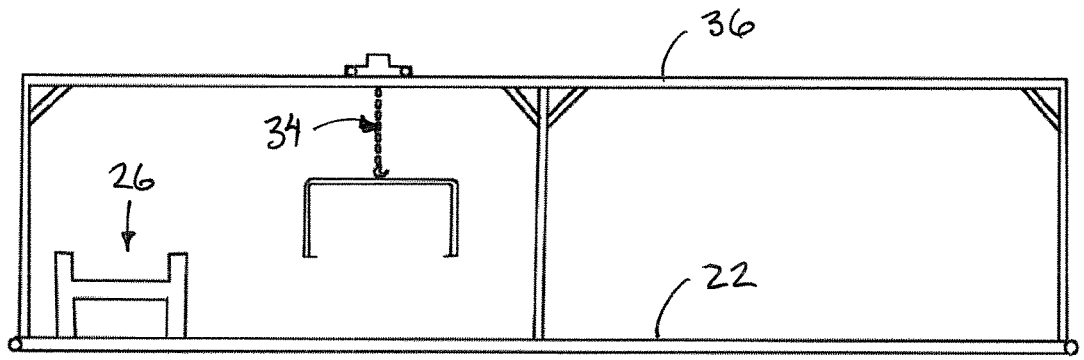
FIG. 2 is a side view of the loading platform at the preparation area.
Figure 3:
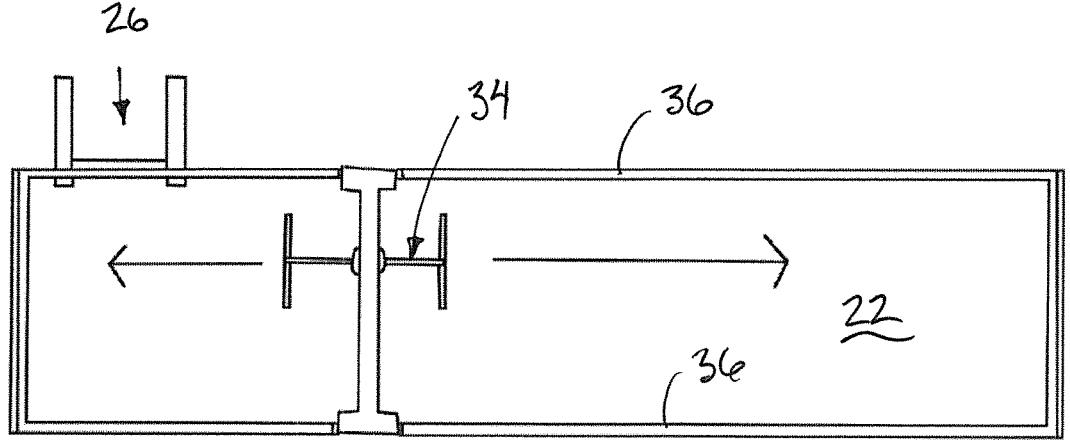
FIG. 3 is a top view of the loading platform at the preparation area.
Figure 4:
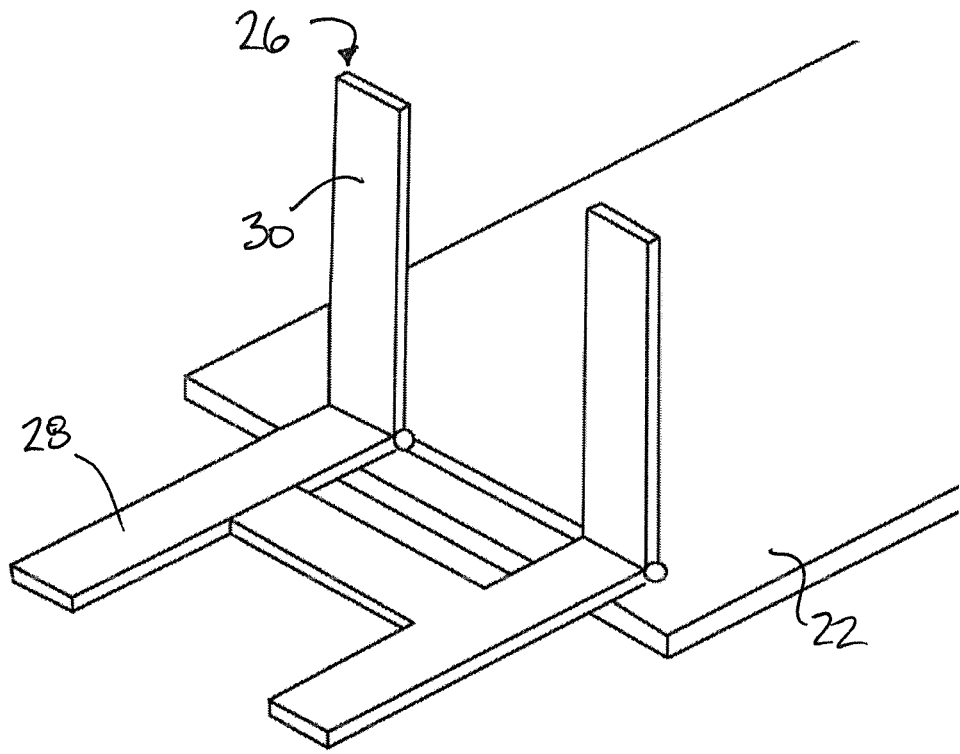
FIG. 4 is a perspective view of the tipping apparatus in a loading orientation.
Figure 5:
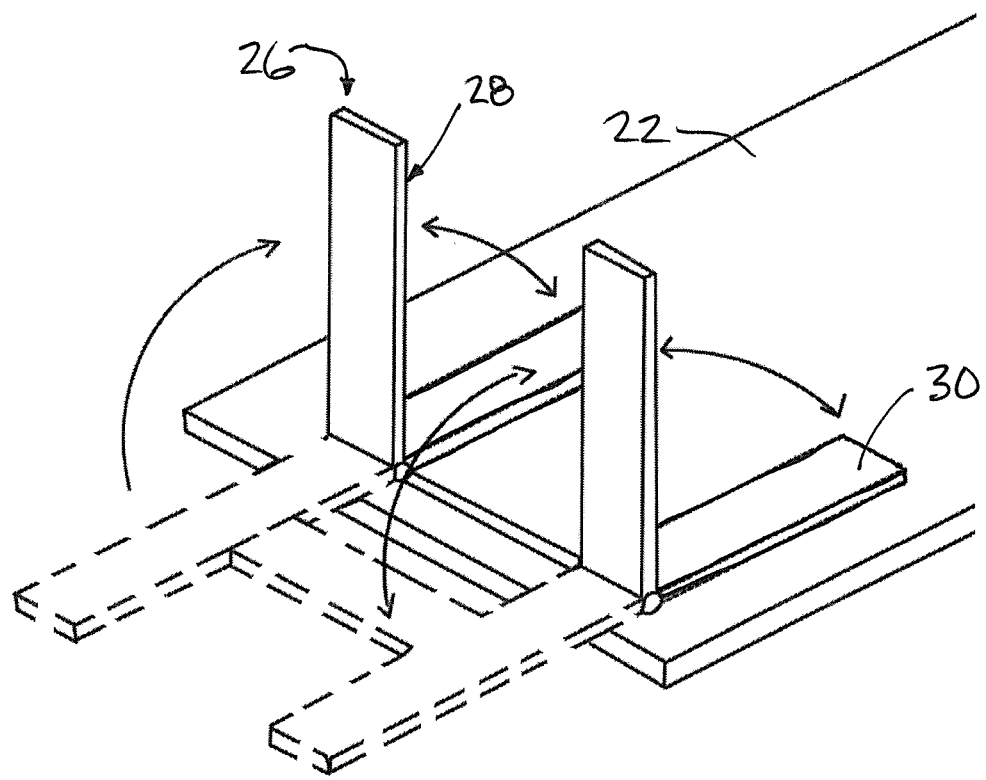
FIG. 5 is a perspective view of the tipping apparatus shown in a landing orientation in broken line.
Figure 6:
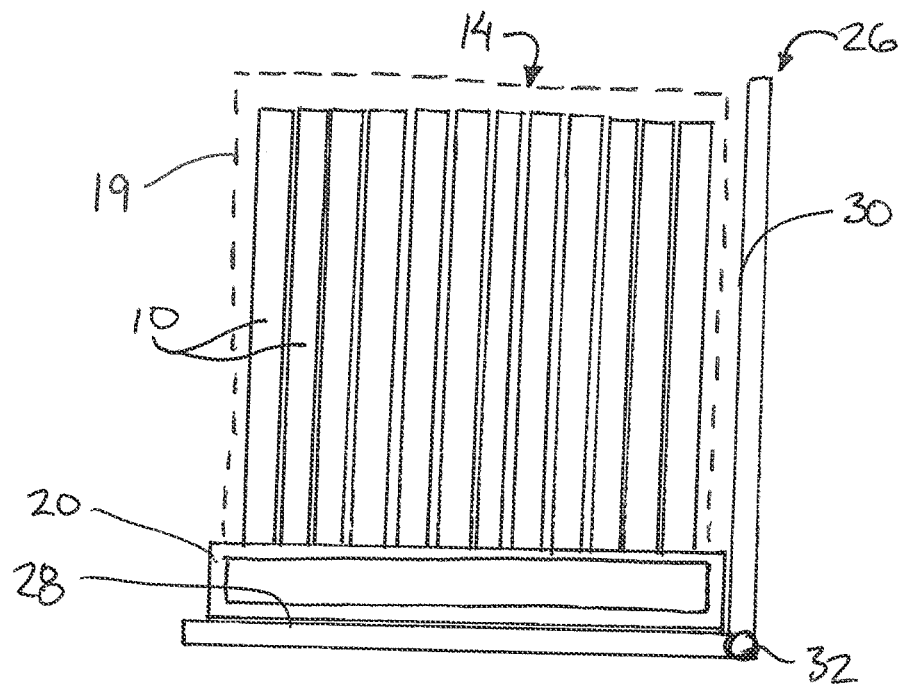
FIG. 6 is a schematic side view of a pallet of solar panels on the tipping apparatus in the loading orientation.
Figure 7:
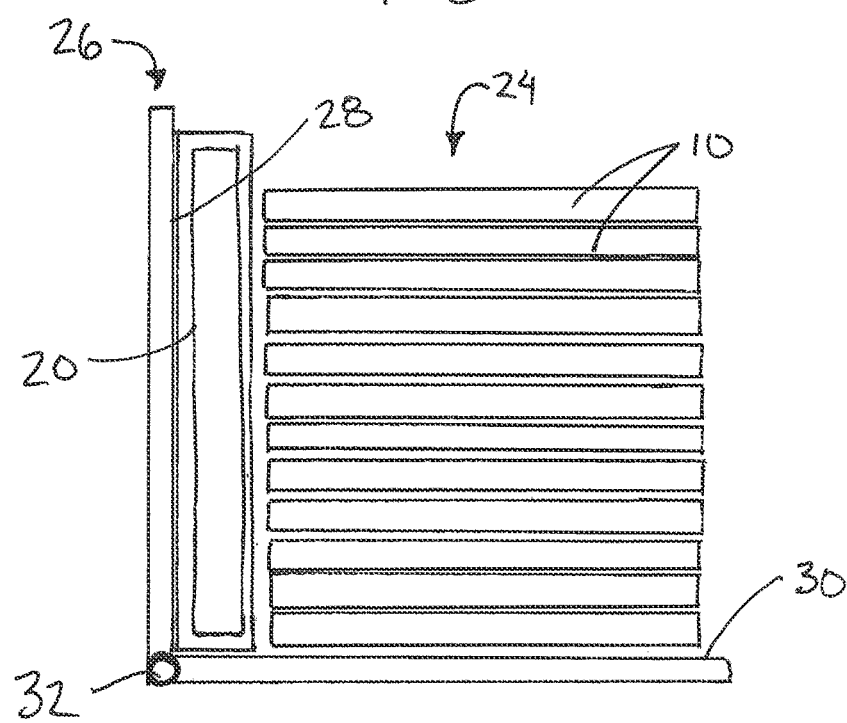
FIG. 7 is a schematic side view of a stack of the solar panels on the tipping apparatus in the landing orientation.

Referring the accompanying figures, there is illustrated a solar panel installation system for preparing and handling solar panels 10 for installation on an array frame 12. The installation system includes both (i) a loading system operated at a preparation site remotely located relative to the array frame 12 where the solar panels are to be installed, and (ii) an unloading system operated at the site of the array frame 12.

At the preparation site, the loading system is used for preparing solar panel packages 14 to be loaded onto the transport deck 16 of a transport vehicle 18. A typical solar panel package 14 includes a bundle of vertically oriented solar panels 10 which are secured with packaging material 19 onto a pallet 20 for delivery to the preparation site. At the preparation area, a horizontal platform 22, for example a loading dock, is arranged to receive the packages 14 for handling prior to loading the solar panels 10 onto the transport deck 16 of the transport vehicle in a loading area directly adjacent to the platform 22.

The transport deck 16 includes an upper supporting surface arrange for supporting a cargo load thereon. In some instances, the transport deck comprises the flatbed deck of a transport truck. Alternatively, the transport deck may comprise a flatbed trailer suitable for towing by a suitable towing vehicle such as a highway truck tractor. In each instance the upper supporting surface is elongate in a forward working direction of the vehicle so as to be arranged to support a longitudinal row of vertical stacks 24 of horizontally oriented solar panels.

Typically, a tipping apparatus 26 is provided adjacent to the platform 22 of the preparation area. The tipping apparatus includes a loading surface 28 comprised of two parallel and spaced apart loading forks and a landing surface 30 comprised of two parallel and spaced apart landing forks in which the loading surface and the landing surface are perpendicularly oriented 90 degrees apart from one another. The loading surface and the landing surface are fixed in orientation relative to one another and are connected to a hinge 32 situated at the intersection of the loading surface and the landing surface. In this manner the tipping apparatus is pivotal about a tipping axis of the hinge 32 through a range of 90 degrees between a loading orientation in which the loading surface is horizontal and faces upward and a landing orientation in which the landing surface is horizontally oriented against an upper supporting surface of the platform 22 and faces upward.

The tipping apparatus 26 receives one of the packages 14 of solar panels onto the loading surface in the loading orientation. Pivoting the tipping apparatus into the landing orientation causes the package to be tipped so that the solar panels are reoriented into a vertical stack of horizontally oriented solar panels. Packaging material can be separated from the solar panels before and/or after tipping of the solar panels from the loading orientation to the landing orientation. The pallet can be removed from the stack of solar panels once in the landing orientation.

Once the solar panels from one of the packages 14 is reoriented into a vertical stack on the level platform 22, additional handling equipment can be used to transfer the vertical stack onto the transport deck. In one embodiment, the vertical stack of pallets can be stacked onto a pallet for subsequent transfer onto the transport deck using pallet handling equipment. Alternatively, pallet handling equipment may be used to lift the stack of vertical panels off the landing forks of the tipping apparatus by offsetting the spacing of the forks of the tipping apparatus relative to standard lift forks of pallet handling equipment. The transport deck in this instance may include a pair of longitudinally extending rails extending in the forward working direction of the transport deck onto which vertical stacks of solar panels may be deposited while allowing the lift forks of the pallet handling equipment to be withdrawn from the vertical stack of panels after depositing onto the rails of the transport deck.

In a further embodiment, the vertical stacks of solar panels are displaced from the platform 22 onto the transport deck using an overhead crane 34 supported on one or more gantry beams 36 supported over top of the platform to span across from the platform 22 in the preparation area to the loading area locating the transport deck therein. In this instance, the crane is supported on a carriage frame movable along the gantry beams 36 in the longitudinal direction of the platform and the transport deck supported at one end of the platform. The crane 34 includes a grappling structure that is lowered over top of a vertical stack of the solar panels deposited by the tipping apparatus so that the vertical stack can be collected within the grappling structure then lifted and transferred to the transport deck along the gantry beam 36 for subsequent deposit onto the upper supporting surface or rails on the upper supporting surface of the transport deck.

The transport deck typically includes a first end support 38 situated at the front end of the upper supporting surface against which the first vertical stack at the forward end of the transport deck can be abutted for transport. Each subsequent stack of solar panels is positioned rearward of the previous stack to form a longitudinally extending row of vertical stacks of solar panels. A spacer 40 is abutted between each adjacent pair of vertical stacks of the solar panels so that the vertical stacks are spaced apart from one another in the longitudinal direction by the corresponding dimension of the spacer. The dimension of the spacer in the longitudinal direction corresponds approximately to the space between an adjacent pair of solar panels 10 once installed upon the racking of an array frame 12 for an installed array of solar panels. A second end support 42 may be situated at the opposing rear end of the transport deck for abutment against the rear side of a rearmost vertical stack of solar panels within the row of stacks. The second end support may be a removable support which is installed for transport but is removed when loading the transport deck. Additional wedges 44 may be secured between the solar panels and the upper supporting surface of the transport deck or between solar panels within each vertical stack to provide additional support to the solar panels being secured to the transport deck for transport from the preparation area to the installation site.

At the installation site, the unloading system is used for transferring the solar panels from the vertical stacks on the transport deck onto the racking of the array frame. Typically, the array frame is provided in longitudinally extending rows in which each row of solar panels within the array frame comprises an elongated rack frame extending in the longitudinal direction of the row of solar panels to be supported thereon. The solar panels are mounted onto the rack of the array frame at a prescribed spacing between adjacent solar panels dictated by the mounting arrangement on the rack. The spacers 40 used between the vertical stacks of solar panels on the transport deck correspond to the prescribed spacing between adjacent solar panels within a respective row of solar panels mounted on the array frame. The positioning of the stacks of solar panels aligned in a row in the longitudinal direction of the transport deck thus corresponds to the positioning of adjacent solar panels aligned within a respective row installed on the array frame.

At the installation site, the transport deck is typically oriented for movement in the forward working direction parallel to and alongside a respective rack upon which the solar panels are to be installed. A lifting vehicle 46 is provided in trailing relationship following behind the transport deck for movement in the forward working direction alongside the rack. The lifting vehicle includes a lifting arm 48 arranged for supporting a lifting ahead 50 thereon. The lifting head includes a rigid frame that is elongate in the longitudinal direction and which supports a row of panel mounts 52 mounted thereon such that each panel mount is arranged to support a respective solar panel thereon and such that the panel mounts are spaced apart from one another within the row corresponding to the spacing of the solar panels within the row on the transport vehicle and within the installed row upon the array frame.

In this arrangement, the lifting head can be lowered onto the vertical stacks of solar panels on the transport deck for simultaneously supporting one solar panel from each vertical stack onto a respective one of the panel mounts on the lifting head. Once the solar panels are secured within the panel mounts of the lifting head, the lifting head can be transferred laterally from the transport deck to a location above the array frame so that the set of solar panels supported in a row on the lifting head are transferred together as a group onto the array frame. Once aligned with the array frame, the solar panels can be sequentially secured to the array frame so that the solar panels can be released from the lifting head and the lifting head returned to an area above the transport deck for collecting a new row of solar panels. After each subsequent transfer of a row of solar panels from the transport deck onto the rack frame of the array frame, the transport deck and the lifting vehicle are displaced forwardly together in the forward working direction to the next installation location along the longitudinal direction of the array frame.

Figure 8:
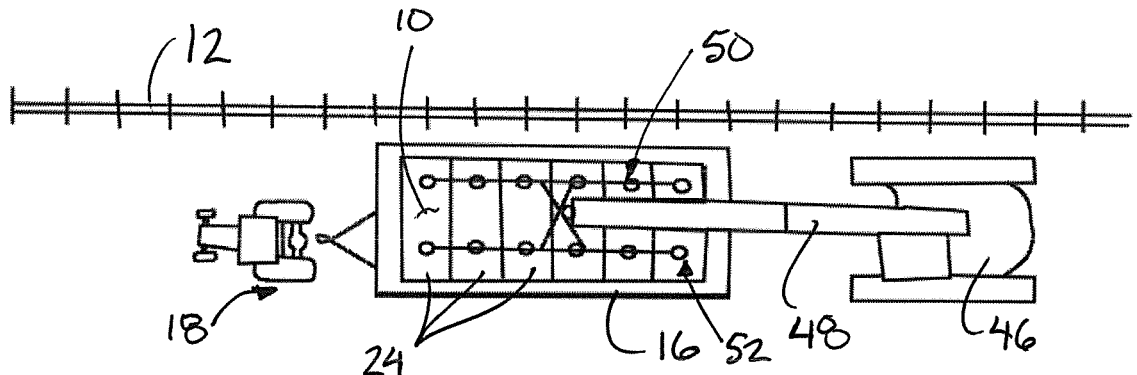
FIG. 8 is a top plan view of a row of vertical stacks of solar panels on the transport deck and a lifting machine being displaced longitudinally alongside a rack of the array frame during installation according to a first embodiment of an installation system.
Figure 9:
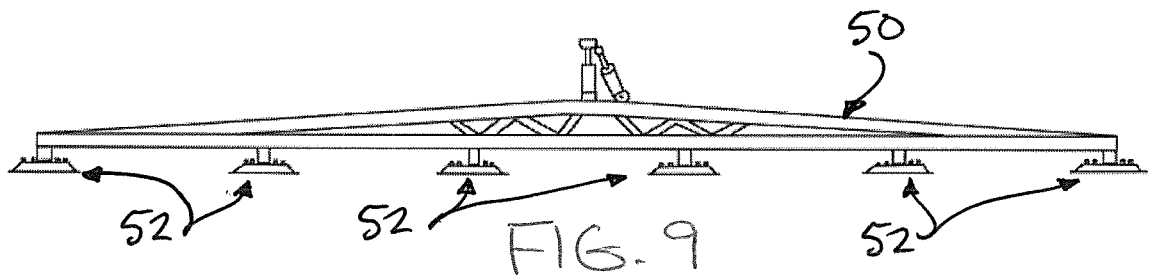
FIG. 9 illustrates a side view of a lifting head of the lifting machine that supports a plurality of suction devices thereon to lift and transfer a row of solar panels from the transport deck to the array frame according to the first embodiment of FIG. 8.
Figure 10:
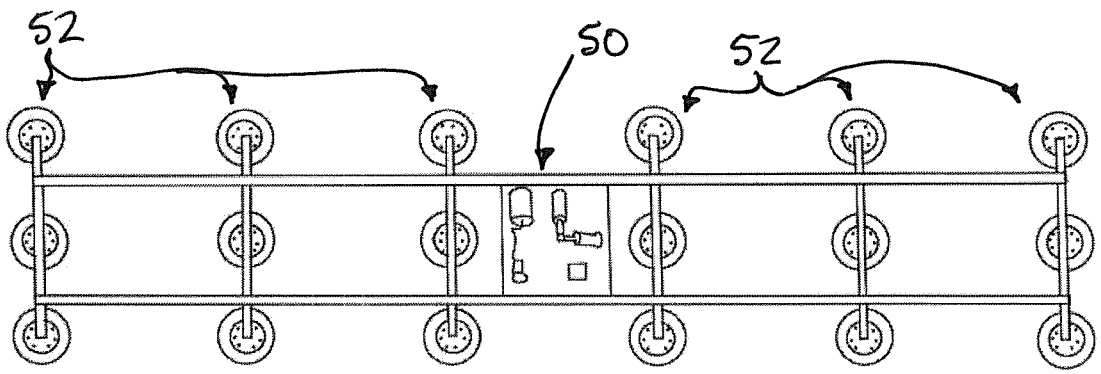
FIG. 10 is a top plan view of the lifting head according to the first embodiment of FIG. 8.

Turning now to a first embodiment of the unloading system according to FIGS. 8 through 10, the lifting vehicle 46 in this instance comprises an excavator and the lifting arm 48 comprises an excavator boom of the excavator. The lifting head 50 in this instance is mounted in place of the conventional excavator bucket at the end of the excavator boom. In this instance, the excavator can be oriented for movement in the forward working direction parallel and alongside the longitudinal direction of the rack of the array frame while the lifting head can be displaced laterally between the transport deck and the rack of the array frame by pivoting of the excavator boom about an upright pivot axis of the excavator.

The lifting head in this instance includes an elongate frame oriented in the direction of the row of solar panels to be supported thereon such that the frame comprises one or more trusses providing stiffness in the longitudinal direction. Each panel mount 52 in this instance comprises a laterally oriented row of suction devices 54 arranged for attachment to the upper supporting surface of the solar panel using vacuum pressure. The lifting head in this instance is suited for supporting a row of six solar panels thereon when the solar panels are in turn supported in a row of six vertical stacks along a transport deck such as an elongated flat deck trailer as shown in FIG. 8.

Figure 11:
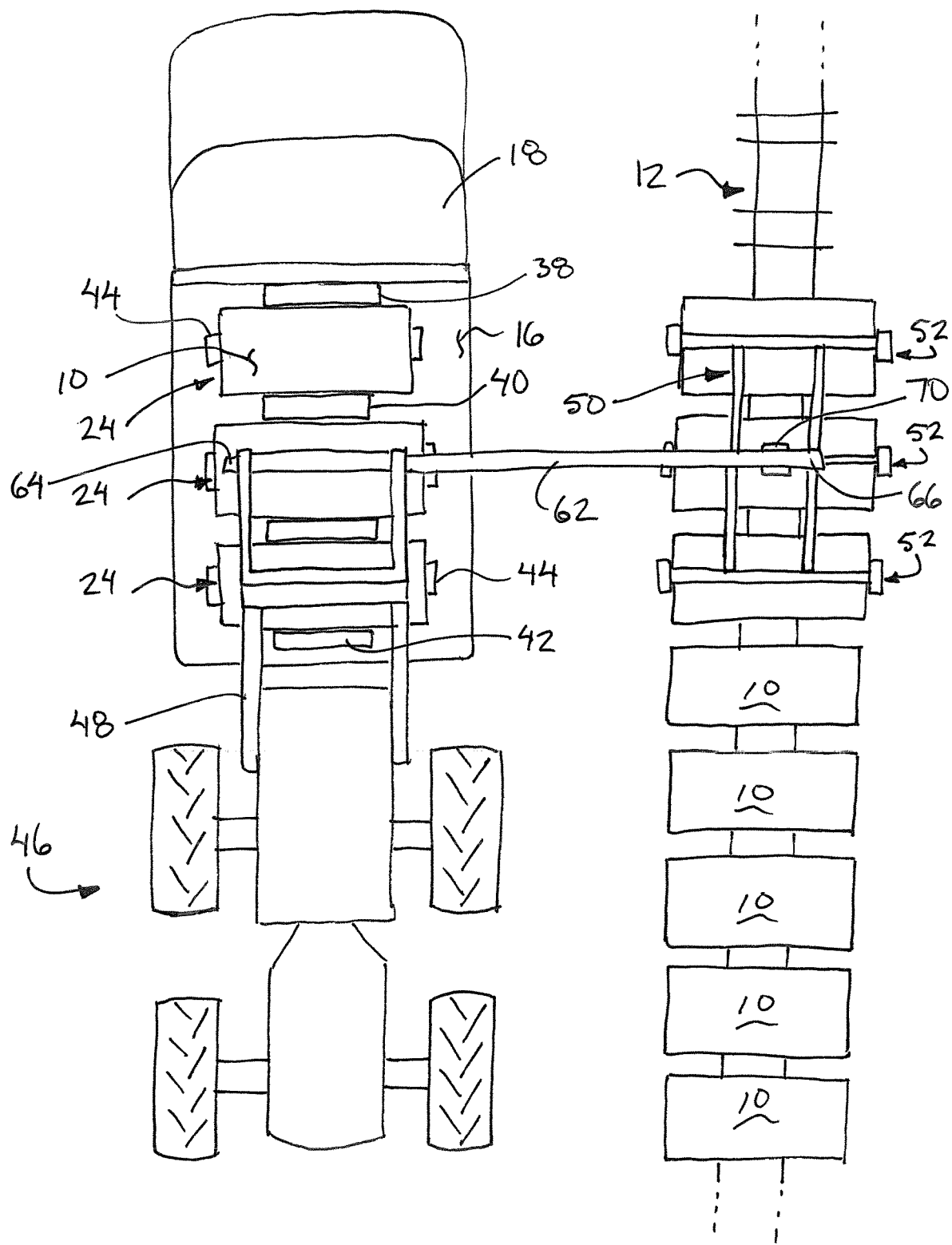
FIG. 11 is a top plan view of (i) the transport deck including a row of vertical stacks of solar panels thereon and (ii) the lifting machine including an adapter for transferring the solar panels to the rack array frame while being oriented for displacement longitudinally alongside the array frame according to a second embodiment of an installation system.
Figure 12:
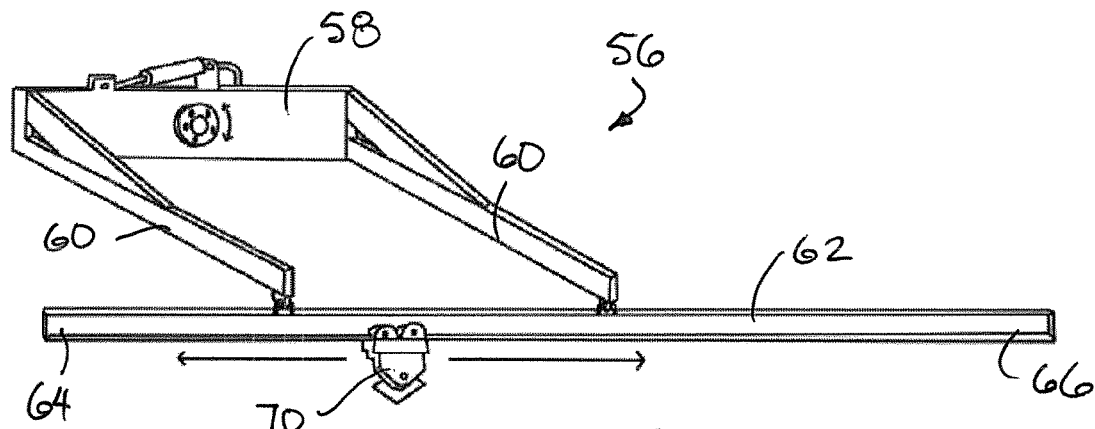
FIG. 12 is a perspective view of an adapter frame for supporting the lifting head on the lifting machine according to the second embodiment of FIG. 11.
Figure 13:
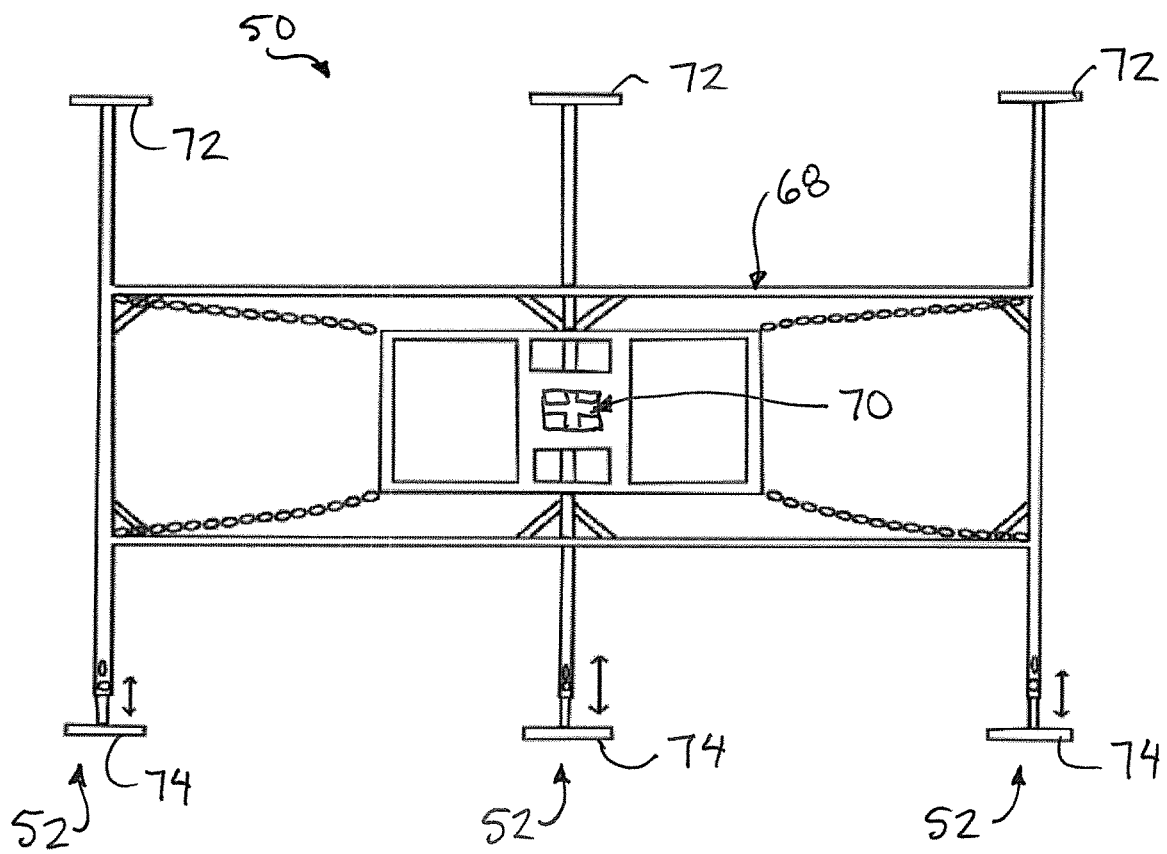
FIG. 13 is a top plan view of the lifting head according to the second embodiment of FIG. 11.
Figure 14:
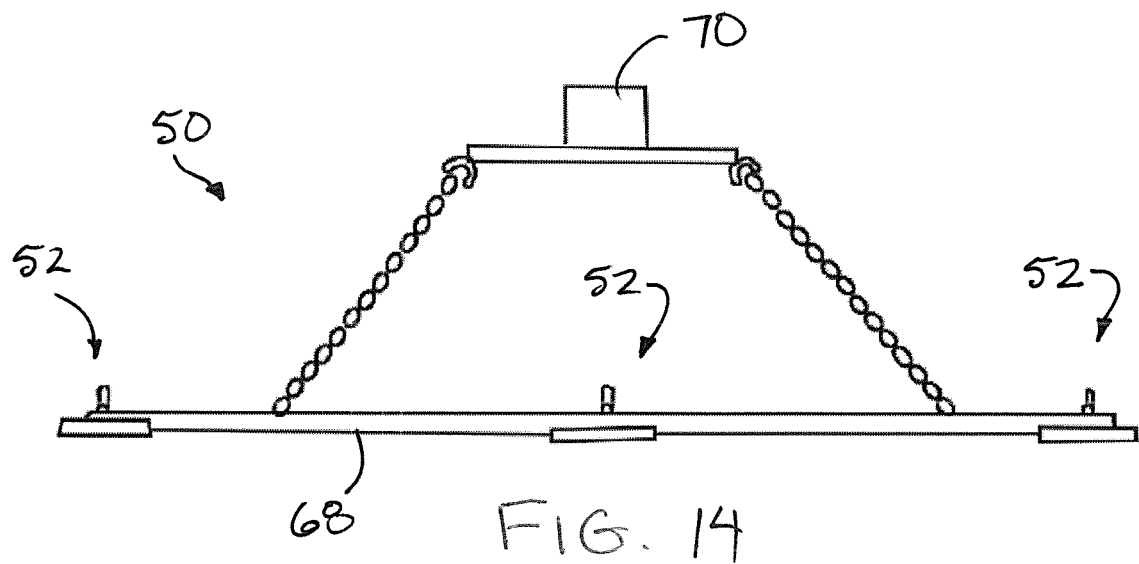
FIG. 14 is a side elevational view of the lifting head according to the second embodiment of FIG. 11.

Alternatively, as shown in FIG. 11, the lifting vehicle in this instance may comprise a front-end loader in which the lifting arm comprises a pair of loader arms extending forward from the front end of the loader. In this instance an adapter frame 56 is supported on the loader arms in place of a conventional loader bucket. As shown in FIG. 12, the adapter frame includes a rear mount 58 that mounts to the adapter plate at the forward end of the loader arms and two frame members 60 protruding forwardly at laterally spaced positions from the rear mount 58. The frame members 60 mount a laterally oriented support beam 62 extending perpendicularly across the frame member 60. The support beam 62 includes a proximal end 64 mounted adjacent to the frame members 60 and a distal end 66 cantilevered laterally outward from one side of the adapter frame 56 such that the distal end 66 is arranged to be supported spaced above the array frame when the lift vehicle is oriented for travelling in a forward working direction of the vehicle alongside the longitudinal direction of the array frame rack.

The lifting head 50 in this instance comprises a central frame 68 arranged to be suspended from a carriage 70 that is coupled for rolling movement along the support beam 62. The central frame 68 supports a set of three panel mounts 52 at longitudinally spaced positions along the main frame. Each panel mount in this instance comprises a cooperating pair of clamping jaws including a fixed jaw 72 fixed relative to the main frame at one side of the main frame and an opposing moving jaw 74 which is adjustable in spacing relative to the fixed jaw so as to be arranged for clamping against lengthwise opposing ends of a solar panel received between the jaws of the panel mount.

In use, the lifting head 50 is positioned at the proximal end of the support beam 62 and the loader arms are lowered to lower the panel mounts onto respective vertical stacks of solar panels. The panel mounts are operated to close the moving jaw towards a fixed jaw for clamping the top solar panel in a respective vertical stack on the transport deck within the panel mount. The loader arms can then be raised slightly to lift the top solar panels from the vertical stacks followed by displacement of the carriage 70 of the lifting head laterally along the support beam 62 from the proximal end 64 to the distal end 66 to locate the solar panels above respective mounting locations on the rack. Lowering of the loader arms again acts to lower the solar panels onto the rack of the array frame to allow the solar panels to be secured to the array frame prior to releasing each solar panel from its respective panel mount.

Figure 15:
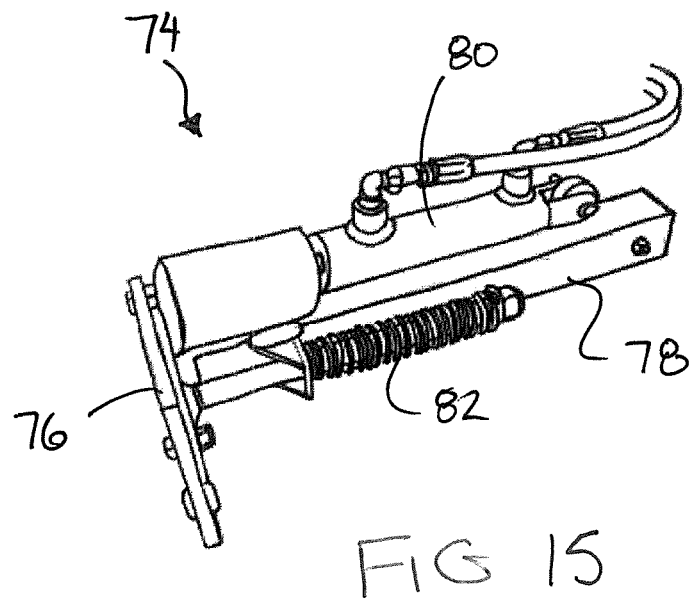
FIG. 15 is a perspective view of a clamping jaw forming one of the panel mounts of the lifting head according to the second embodiment of FIG. 11.

As shown in FIG. 15, according to one example of the moving jaw 74, the jaw comprises an end plate 76 supported at the end of a telescoping arm which is telescopically received within the open end of a tubular frame member 78 of the main frame of the lifting head. A hydraulic linear actuator 80 is operatively connected between the frame member 78 and the telescoping arm supporting the end plate 76 thereon so that the actuator can be actuated in a direction which retracts the telescoping arm under hydraulic force to apply a clamping force that clamps the opposing fixed and moving jaws towards one another. When it is desired to release the solar panel from the panel mount, pressure is released from the hydraulic cylinder. A compression spring 82 is also operatively connected between the tubular frame member 78 in the telescoping arm that supports the end plate 76 thereon such that in the absence of a hydraulic clamping force being applied to the hydraulic actuator 80, the compression spring biases the moving jaw outwardly into a released position to release the solar panel from the panel mount. The compression spring 82 maintains the panel mount in an open and released configuration until hydraulic pressure is again applied to the hydraulic actuator 80 to retract the movable jaw and close the panel mount towards a clamps position receiving a solar panel clamped between the fixed jaw and the moving jaw of the panel mount.

As described herein the present invention is a Photovoltaic (PV) Module Delivery and Installation System. Through combining specialty equipment, organized work-flow processes, and logical management of labor deployment, an innovative process has been created for the delivery and installation of PV Modules on the "racking" (galvanized steel frames for mounting PV modules) of utility-scale ground-mounted solar arrays.

Module Loading:

A typical module loading crew consists of a crew of 7, comprised of: a coordination supervisor and assistant, responsible for communication between the installation crew(s), management, and the loading crew, the loading station crew of a lead hand and two labourers (loaders), the transportation crew with two operators (Hauler Tractor operators).

PV Modules arrive at the site location (generally delivered in sea-cans) and are unloaded with standard skid-steer or telehandler (henceforth, loader) through the use of off-loading ramps, and are then organized in a storage/laydown area.

Modules tend to come vertically stacked in a box that is banded to a pallet with 26 to 30 modules per grouping (mod-pallets). Labourers will, if necessary, make an identifying mark on the glass-side of the box to aide in loading orientation.

The loader transports one mod-pallet at a time, with the identified glass-side facing the operator, to the "Loading station or Loading dock".

At the cassette loading station the loader places the module-pallet on the "loading-side" forks of the tipping apparatus, or tipper.

The tipping apparatus, when in its normal position, is located on the rear end of the cassette loading station. A "normal position" for the tipping apparatus is defined as when the "loading-side" forks are positioned horizontally, and the "landed-side" forks are positioned vertically.

Once the loading equipment has placed the mod-pallet on the loading-side forks of the tipper and has exited the loading zone, a crewmember on the loading station may engage the tipper's controls. When the controls are engaged, the tipper utilizes a hydraulic cylinder centered beneath the "loading side" to push the forks upwards and forwards in an arc, rotating the apparatus 90-degrees, and ending in its "tipped" or "landed" position. The area encompassed by the tipper in its full scope of movement is considered a no-go-zone due to the potential of crushing hazards, and is therefore made inaccessible to people through barriers and signage. The crewmember who operates the controls for the tipper does so from a safe distance with a clear view of the tipper's full operation.

The mod-pallet, which had been placed on the loading-side forks and then rotated along with the tipper, from the perspective of the modules moves from a vertical position facing outwards from the rear of the loading station, to laying horizontally facing skyward on the loading station deck, having been "landed."

With the mod pallet now effectively "tipped," and accessible, the loading station crew members can remove any strapping or banding, the cardboard box, and the pallet if necessary (it is often the case that the pallet is not connected to the cardboard box or modules, and will remain on the tipper forks as the mod-stack is moved by the gantry crane). Recycle and waste bins will be located beside the cassette loading station for easy and immediate containment and control of all plastic and cardboard.

The overhead gantry crane is utilized to pick the entire stack of modules. A swivel connection on the crane allows for full rotation of the panels so their positive/negative alignment can be adjusted to correspond with any combination of module orientations for specific loading or placement demands. The PV modules are transferred along the loading dock by the gantry, and placed directly on the transport vehicle in corresponding order. The transport vehicle may be a truck with a flat deck or a tractor and trailer.

A loading station crewmember may now reverse the controls for the tipper returning it to its normal position, ready to be loaded with another mod-pallet. During the full phase of operations, if the previous pallet remains on the tipper forks when the module-stack is moved forward, the loader will be required to remove said pallet off of the tipper forks before loading on a new mod-pallet. Alternatively, if the pallet is carried forward with the mod-stack, the pallet may be removed by the loading station crew and placed in a zone accessible to the loader for movement to a pallet recycle or storage zone at a later time.

Spacers are placed between each mod-stack as they are wheeled into position on the cassette trailer. The function of the "spacer" is to provide a barrier of a predetermined distance between each mod-stacks. The spacers are made of a smooth/non-abrasive material such as puck-board, and are between 10 mm-25 mm in thickness, depending on the specifications of a given racking system.

The transport operator and swamper secure the loaded mod-stacks on the transport vehicle. Wedges are placed in the deck pin pockets on the flat deck truck beds, preventing the modules from moving in any direction during transport across the site.

In total three mod-stacks will be loaded onto each transport vehicle; however, the amount of mod-stacks able to be placed on each transport vehicle is subject to change according to the variables of trailer length, size requirements of mod-lifting equipment and racking size, and time constraints for loading.

Once the transport vehicles are fully loaded they travel to the area of module installation.

Module Installation

A typical module installation crew consists of a crew of 6, comprised of: the installing crew of a lead hand and two labourers (fasteners,) the equipment crew of a "lifter" machine operator and swamper, the transportation or "Hauler Tractor" operator (which deliver loaded cassette trailers and return empty ones.) A "Swamper" in this context refers to a labourer whose job it is to safely guide the operator and control the suspended load of the "lifter" and all related equipment.

The transport vehicle operator positions themselves and the loaded cassette trailer ahead of the module installation crew in the intended direction of work. A typical utility-scale solar ground-mount array is laid out in lengthy rows comprised of "tables" of racking that can run uninterrupted indefinitely. Rows of tables will all run in the same orientation specific to the site itself, and have breaks for roadways, natural features, underground services, or access points.

The Lifter operator positions the lifting apparatus or Lifter (which is attached to the lifting machine) above the transportation vehicle and lowers down onto the top of the mod-stacks. A swamper is available to provide guidance as necessary.

With the lifter resting on the top level of modules in the mod-stack, the Lifter operator disengages the hydraulics, which in turn engages the integrated clamps by use of tension springs ensuring adequate contact and pressure on the panel edges within the parameters of compression on the frame of the module as stated by the module manufacturer. The Swamper will notify the Operator once clamps are engaged and the panels are free to be lifted.

Once clear, the lifting machine with attached lifter and modules maneuvers towards the racking. The precision and rigidity of the lifting machine and its integrated lifting apparatus is the key to its heightened safety factors, as it allows for all-weather work and eliminates strain and exhaustion brought on by redundant manual lifting and carrying.

Once the swamper has confirmed that the module group is appropriately positioned on the racking, the operator locks their controls, and the lead hand and fasteners secure the modules to the racking. Methods and styles of fastening modules to the racking differ between racking manufacturers, and must be accommodated ahead of any project. If the modules do not perfectly correspond to their intended position on the racking, the fasteners can release the clamp on the specific module(s) in question.

As the fasteners complete their portion, the swamper directs the Hauler Tractor operator forward to the next position.

Once the Lead Hand indicates to the operator that all modules are secured to the racking, the operator can engage his controls and advance towards the next position behind the cassette trailer.

The process of setting the lifter onto the module group, placing on the racking, and securing modules to the racking is repeated until the entire module-stack has been placed; at which point the coordination supervisor from the loading crew will have a second cassette trailer ready to pull into position as the empty trailer pulls away and returns to the loading station.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A method of installing solar panels on an array frame, the method comprising:
   (a) providing a plurality of solar panels in packages, in which each package comprises a plurality of the solar panels secured in a bundle on a pallet using packaging material and in which each solar panel is vertically oriented within the bundle;
   (b) removing the packaging material from the solar panels;
   (c) tipping one of the bundles in a preparation area such that the solar panels of said one of the bundles forms an individual vertical stack of horizontally oriented individual solar panels;
   (d) separating the vertical stack from the pallet in the preparation area;
   (e) transferring the vertical stack from the preparation area onto an upper supporting surface of a transport deck;
   (f) repeating steps (c) through (e) until a row of said vertical stacks are supported on the upper supporting surface of the transport deck;
   (g) providing a lifting machine having a lifting arm and a lifting head on the lifting arm, the lifting head including one or more panel mounts arranged to support one or more solar panels thereon, the lifting head being supported by the lifting arm for movement between the transport deck and the array frame;
   (h) collecting at least one solar panel from the vertical stacks on the transport deck using the one or more panel mounts;
   (i) transferring said at least one solar panel from the transport deck to the array frame using the lifting head; and
   (j) depositing said at least one solar panel on the array frame by releasing said at least one solar panel from the one or more panel mounts of the lifting head.

2. The method according to claim 1 further comprising displacing the transport deck and the lifting machine longitudinally alongside the array frame and repeating steps (h) through (j).

3. The method according to claim 1 further comprising providing a first end support at a first end of the transport deck and abutting a first vertical stack of the solar panels against the end support.

4. The method according to claim 3 including providing a removable second end support at an opposing second end of the transport deck in abutment with a final vertical stack within a row of stacks opposite from the first vertical stack.

5. The method according to claim 1 wherein the panel mounts on the lifting head comprise suction devices arranged to support the solar panels thereon using a vacuum pressure.

6. The method according to claim 1 wherein the panel mounts comprise clamping devices having opposing jaws arranged to be clamped against opposing ends of the solar panels.

7. The method according to claim 1 wherein the lifting machine comprises an excavator and the lifting arm comprises an excavator arm of the excavator, the excavator arm supporting the lifting head thereon, the method comprising displacing the lifting machine alongside the array frame in a forward working direction and moving the lifting head transversely to the forward working direction between the transport deck and the array frame.

8. The method according to claim 1 wherein the lifting machine comprises a loader and the lifting arm comprises loading arms of the loader, the method comprising:
   orienting the lifting machine to be displaced alongside the array frame in a forward working direction;
   mounting an adapter frame on the loading arms of the loader in place of a convention loader bucket, the adapter frame including a support beam extending transversely to the forward working direction from a proximal end above the transport deck to a distal end of the support beam above the array frame;
   supporting the panel mounts for translating movement along the support beam of the adapter frame;
   loading the solar panels on the panel mounts at the proximal end of the support beam;
   displacing the panel mounts along the support beam towards the distal end of the support beam; and
   installing the solar panels onto the array frame at the distal end of the support beam.

9. The method according to claim 1 further comprising:
   providing a tipping apparatus comprising a loading surface and a landing surface oriented perpendicularly to one another and being movable together about a tipping axis through a range of 90 degrees between a loading orientation in which the loading surface faces upward and a landing orientation in which the landing surface faces upward;
   loading one of the packages onto the loading surface in the loading orientation of the tipping apparatus such that the solar panels of the package are parallel to the landing surface;
   tipping one of the packages by pivoting the tipping apparatus onto the preparation area from the loading orientation to the landing orientation; and
   collecting the stack of solar panels from the tipping apparatus when transferring the vertical stack from the preparation area onto the upper supporting surface of the transport deck.

10. The method according to claim 1 including positioning the transport deck adjacent to the preparation area and transferring the stack of solar panels from the preparation area to the transport deck using pallet handling equipment.

11. The method according to claim 1 including positioning the transport deck in a transport loading area and transferring the vertical stack of solar panels from the preparation area to the transport deck using a gantry crane extending over the preparation area and the transport loading area.

12. A method of installing solar panels on an array frame, the method comprising:
(a) providing a plurality of solar panels in packages, in which each package comprises a plurality of the solar panels secured in a bundle;
(b) preparing one of the bundles in a preparation area such that the solar panels of said one of the bundles forms an individual vertical stack of horizontally oriented solar panels;
(c) transferring the vertical stack from the preparation area onto an upper supporting surface of a transport deck;
(d) repeating steps (b) and (c) until a longitudinally extending row of the vertical stacks is supported on the upper supporting surface of the transport deck;
(e) providing a lifting machine having a lifting arm and a lifting head on the lifting arm, the lifting head including a plurality of panel mounts comprising opposed clamping jaws arranged to support the solar panels thereon by clamping against opposing edges of the solar panels, the lifting head being supported by the lifting arm for movement between the transport deck and the array frame;
(f) simultaneously collecting one solar panel from more than one of the vertical stacks on the transport deck so as to support a row of the solar panels on the lifting head using the opposed clamping jaws of the lifting machine;
(g) transferring the row of solar panels from the transport deck to the array frame using the lifting machine; and
(h) depositing the row of solar panels together onto the array frame using the lifting machine by releasing the row of solar panels from the panel mounts of the lifting head of the lifting machine.

13. The method according to claim 12 wherein the lifting head comprises a rigid frame extending in a longitudinal direction of the row of the solar panels and a plurality of the panel mounts arranged in a row along the rigid frame.

14. The method according to claim 12 including providing spaces between adjacent ones of the vertical stacks of the solar panels within the row of the vertical stacks on the transport deck, each space having a dimension in the longitudinal direction that is equal to a prescribed spacing between adjacent ones of the solar panels installed on the array frame.

15. The method according to claim 12 wherein at least some of the opposed clamping jaws of the panel mounts comprise movable jaws, each movable jaw being movable in a first direction from a released position to a clamped position and in a second direction from the clamped position to the released position in which the solar panels are clamped between the clamping jaws of the panel mounts in the clamped position, each movable jaw being operatively connected to (i) a spring member arranged to urge the movable jaw in one of the first direction or the second direction and (ii) a hydraulic actuator arranged to controllably urge the movable jaw opposite to the spring member.

16. A method of preparing solar panels for installation on an array frame, the method comprising:
providing the solar panels in packages, in which each package comprises a plurality of the solar panels arranged vertically in a bundle;
providing a tipping apparatus in a preparation area, the tipping apparatus comprising a loading surface and a landing surface oriented perpendicularly to one another and being movable together about a tipping axis through a range of 90 degrees between a loading orientation in which the loading surface faces upward and a landing orientation in which the landing surface faces upward;
loading one of the packages onto the loading surface in the loading orientation of the tipping apparatus such that the solar panels of the package are parallel to the landing surface;
tipping said one of the packages in the preparation area by pivoting the tipping apparatus onto the preparation area from the loading orientation to the landing orientation such that the bundle of solar panels of the package forms an individual vertical stack of horizontally arranged solar panels;
providing a transport deck having an upper supporting surface within a loading area adjacent to the preparation area;
providing an overhead transfer apparatus including at least one gantry beam spanning over the preparation area and the loading area and a grappling structure movable along the at least one gantry beam from the tipping apparatus in the preparation area to the transport deck in the loading area; and
transferring the vertical stack from the tipping apparatus in the preparation area onto the upper supporting surface of the transport deck using the overhead transfer apparatus by collecting the vertical stack with the grappling structure and displacing the grappling structure along the at least one gantry beam from the tipping apparatus to the transport deck.

17. The method according to claim 16 including removing packaging materials from the stack of solar panels prior to transferring the stack of solar panels from the preparation area onto the upper supporting surface of the transport deck.

* * * * *